US012791009B2

(12) United States Patent
Zheng et al.

(10) Patent No.: US 12,791,009 B2
(45) Date of Patent: Nov. 10, 2026

(54) METHOD AND DEVICE FOR MONITORING OPERATION OF WIND POWER BEARING HOLDER

(71) Applicant: SHANDONG GOLDEN EMPIRE PRECISION MACHINERY TECHNOLOGY CO., LTD, Liaocheng (CN)

(72) Inventors: Guanghui Zheng, Liaocheng (CN); Peizhen Zhao, Liaocheng (CN)

(73) Assignee: SHANDONG GOLDEN EMPIRE PRECISION MACHINERY TECHNOLOGY CO., LTD, Liaocheng (CN)

( * ) Notice: Subject to any disclaimer, the term of this patent is extended or adjusted under 35 U.S.C. 154(b) by 405 days.

(21) Appl. No.: 18/540,988

(22) Filed: Dec. 15, 2023

(65) Prior Publication Data

US 2024/0376866 A1 Nov. 14, 2024

Related U.S. Application Data

(63) Continuation of application No. PCT/CN2023/106149, filed on Jul. 6, 2023.

(30) Foreign Application Priority Data

May 9, 2023 (CN) ........................ 202310510947.6

(51) Int. Cl.
*F03D 17/00* (2016.01)

(52) U.S. Cl.
CPC ......... *F03D 17/032* (2023.08); *F03D 17/005* (2023.08); *F03D 17/015* (2023.08)

(58) Field of Classification Search
None
See application file for complete search history.

(56) References Cited

U.S. PATENT DOCUMENTS 7,677,869 B2 * 3/2010 Martinez De Lizarduy Romo ..... G05B 23/0283 416/37
2015/0178633 A1 * 6/2015 ElBsat .................... G06F 17/16 706/14

(Continued)

FOREIGN PATENT DOCUMENTS

CN 105043737 A 11/2015
CN 105222772 A 1/2016

(Continued)

OTHER PUBLICATIONS

Liu Fangzheng, et al., Contact Characteristics Analysis for Double-Row Spherical Roller Bearing Based on Romax, Design and Research, 2022, pp. 1-4,8.

(Continued)

*Primary Examiner* — Huy Q Phan
*Assistant Examiner* — Carl F.R. Tchatchouang
(74) *Attorney, Agent, or Firm* — Bayramoglu Law Offices LLC

(57) ABSTRACT

A method and device for monitoring operation of a wind power bearing holder. The method includes: performing multi-cluster head assisted tracking at multi-point locations on an operation state of the wind power bearing holder via a plurality of sensing chips preinstalled in the wind power bearing holder to obtain point location tracking information; perform point location-related motion vector correction and prediction on orthogonally covered point location tracking information to obtain a circumferential motion trajectory of the point locations; performing irregular trajectory filtering processing on a current circumferential motion trajectory to obtain an ideal circumferential motion trajectory; and comparing locations of probability centroids between an ideal circumferential spatial region and a predicted circumferen- (Continued)

tial spatial region, to obtain operation monitoring information of the wind power bearing.

4 Claims, 4 Drawing Sheets

(56) References Cited

U.S. PATENT DOCUMENTS

| | | | | |
|---|---|---|---|---|
| 2017/0045034 | A1* | 2/2017 | Lai | F03D 3/0427 |
| 2019/0226943 | A1 | 7/2019 | Hayashi et al. | |

FOREIGN PATENT DOCUMENTS

| | | | |
|---|---|---|---|
| CN | 208810609 | U | 5/2019 |
| CN | 110823540 | A | 2/2020 |
| CN | 110907170 | A | 3/2020 |
| CN | 211178975 | U | 8/2020 |
| CN | 112965476 | A | 6/2021 |
| CN | 213516341 | U | 6/2021 |
| CN | 113347561 | A | 9/2021 |
| CN | 114576102 | A | 6/2022 |
| CN | 114629609 | A | 6/2022 |
| CN | 114918739 | A | 8/2022 |
| CN | 115114965 | A | 9/2022 |
| CN | 115493843 | A | 12/2022 |
| CN | 115728057 | A | 3/2023 |
| CN | 116070154 | A | 5/2023 |
| JP | 2012026500 | A | 2/2012 |
| WO | 2021036639 | A1 | 3/2021 |

OTHER PUBLICATIONS

Du Gang, et al., WSN Node Location Algorithm Based on Motion Trajectory Capture and Coupled Orthogonal Coverage, Computer Engineering, 2020, pp. 157-162,171, vol. 46, No. 3.

Tu Wenbing, et al., Dynamic analysis of impact contact characteristics of the cage of a rolling bearing under variable working conditions, Journal of Vibration and Shock, 2022, pp. 278-286, vol. 41, No. 4.

Ma Xingjian, et al., Research on Three Dimensional Spatial Localization Algorithm Based on Weed Population Diffusion, Informatization Research, 2021, pp. 38-43, vol. 47, No. 2.

* cited by examiner

METHOD AND DEVICE FOR MONITORING OPERATION OF WIND POWER BEARING HOLDER

CROSS REFERENCE TO RELATED APPLICATIONS

This application is a continuation application of International Application No. PCT/CN2023/106149, filed on Jul. 6, 2023, which is based upon and claims priority to Chinese Patent Application No. 202310510947.6, filed on May 9, 2023, the entire contents of which are incorporated herein by reference.

TECHNICAL FIELD

The present application relates to the field of data monitoring and prediction, and in particular, to a method and device for monitoring operation of a wind power bearing holder.

BACKGROUND

As a kind of green energy, wind power has developed at an unexpected speed since the 1980s, and has become a new energy power generation mode widely used with the maturity of related technology. With the long-term operation of a wind power generator under complex alternating loads, the requirements of the wind power transmission system are becoming more and more stringent. As a key component of the wind power generator, the bearing plays a vital role in ensuring the reliability of the whole wind power generator.

At present, the failure rate of the gearbox and the motor in the wind power generator is high, and most of these failures are caused by the failure of the wind power bearing. The existing vibration sensors are generally installed inside the wind power generator to monitor the operation state of the wind power spindle, monitor abnormalities of signals such as voltage, current and power in the wind power generator, and indirectly monitor operation of the wind power bearing or the wind power bearing holder.

However, the above-mentioned vibration sensor monitoring method is difficult to monitor the operation characteristic quantities of the specific operation condition of the wind power bearing or the wind power bearing holder, and is hysteretic as the operation characteristic quantities are often monitored only after a fault occurs and causes severe vibrations. In addition, the location of a wind power generation device is often remote, and the maintenance time period is too long, so that it is easy to cause irreparable losses to the wind power generator, blades and hubs, etc., resulting in a large waste of resources. Besides, it is difficult to perform real-time on-line monitoring and prediction on the operation condition of the existing wind power generator, and it cannot be fed back to the maintenance personnel timely and by way of early warning, which increases the operation and maintenance costs of the wind power generator.

SUMMARY

The embodiments of the present application provide a method and device for monitoring operation of a wind power bearing holder for solving the following technical problems: it is difficult to perform real-time on-line monitoring and prediction on the operation condition of an existing wind power generator, and there is a certain delay in fault reporting of wind power generators, which is not conducive to rapid maintenance for abnormal wind power generators and greatly increases maintenance costs.

The embodiments of the present application adopt the following technical solutions.

In an aspect, an embodiment of the present application provides a method for monitoring operation of a wind power bearing holder. The method includes: performing multi-cluster head assisted tracking at multi-point locations on an operation state of the wind power bearing holder via a plurality of sensing chips preinstalled in the wind power bearing holder to obtain point location tracking information; wherein the point location tracking information includes: target coordinate data and corresponding acceleration data of all sensing chips in any time period; performing point location-related orthogonal covering on the point location tracking information; and performing point location-related motion vector correction and prediction on orthogonally covered point location tracking information to obtain circumferential motion trajectories of the point locations; wherein the circumferential motion trajectories include: a current circumferential motion trajectory and a predicted circumferential motion trajectory; acquiring an instantaneous vibration circumferential trajectory of the wind power bearing holder according to a vibration acceleration of the wind power bearing holder; performing irregular trajectory filtering processing on the current circumferential motion trajectory in the circumferential motion trajectories with the instantaneous vibration circumferential trajectory to obtain an ideal circumferential motion trajectory of the wind power bearing holder; generating a corresponding ideal circumferential spatial region and a corresponding predicted circumferential spatial region for the ideal circumferential motion trajectory and the predicted circumferential motion trajectory, respectively; and comparing locations of spatial region probability centroids between the ideal circumferential spatial region and the predicted circumferential spatial region to obtain a predicted coincided spatial region; determining whether there is an abnormality in operation of the wind power bearing holder according to the predicted coincided spatial region to obtain operation monitoring information of the wind power bearing, to complete operation monitoring of the wind power generator.

The beneficial effect of the present application is that by monitoring the operation trajectory of the wind power bearing holder in the wind power spindle bearing, a real abnormal operation condition of the wind power bearing holder can be monitored in real time according to the error comparison between the predicted coincided spatial region and the actual coincided spatial region, and then whether there is an abnormality in operation the wind power spindle and the wind power generator can be predicted, which allows possible fault problems to be timely fed back to maintenance personnel so that they can arrive at the site timely to prevent further deterioration of potential faults. The on-line real-time monitoring and prediction of the operation of the wind power generator is facilitated, thereby reducing the delay time of reporting potential faults of the wind power generator, facilitating rapid maintenance of abnormal wind power generators, reducing maintenance costs, and ensuring the normal power generation efficiency of the wind power generator.

In a possible implementation, the performing multi-cluster head assisted tracking at multi-point locations on an operation state of the wind power bearing holder via a plurality of sensing chips preinstalled in the wind power bearing holder to obtain point location tracking information, specifically includes: performing signal acquisition on the plurality of sensing chips in the wind power bearing holder via a signal acquisition apparatus in a wind power generator to determine whether the wind power bearing holder is in operation; wherein the plurality of sensing chips are embedded to be uniformly distributed in the wind power bearing holder to enable the wind power bearing holder to achieve a rotational balance; in a case that the wind power bearing holder is in operation, determining a signal transmitting node of a first sensing chip in operation as a main cluster head node, and determining signal transmitting nodes of a second sensing chip and a third sensing chip as adjacent cluster head nodes; wherein the second sensing chip and the third sensing chip are located at left and right adjacent positions of the first sensing chip, respectively; performing three-dimensional spatial distance calculation with received signal carrier powers on the main cluster head node and the adjacent cluster head nodes based on a predefined time period according to a predefined received signal strength indicator (RSSI) algorithm to obtain main coordinate data and adjacent coordinate data in the current time period; wherein the main coordinate data and the adjacent coordinate data are both three-dimensional coordinate data; minimizing an average spatial distance of the adjacent coordinate data in the current time period according to a least squares algorithm, and performing median value-related calculation on a minimized spatial distance to obtain auxiliary coordinate data; and determining point location tracking information for all sensing chips based on the auxiliary coordinate data and the target coordinate data of the first sensing chip.

The advantageous effect of the present application is that the operation condition of a double-row self-aligning roller bearing can be monitored in real time by the plurality of sensing chips installed in the wind power bearing holder, i.e., the operation posture and operation trajectory of the wind power bearing holder in a three-dimensional space are tracked at multi-point locations in real time, and each sensing chip is tracked in real time based on the adjacent chips of each sensing chip according to the coordinated fusion of a plurality of cluster heads to obtain the main coordinate data and the adjacent coordinate data in the current time period.

In a possible implementation, the determining point location tracking information for all sensing chips based on the auxiliary coordinate data and target coordinate data of the first sensing chip, specifically includes: performing coordinate data-related weight value fusion on auxiliary coordinate data of the adjacent cluster head nodes and main coordinate data of the main cluster head node in the current time period to obtain the target coordinate data of the first sensing chip; determining the signal transmitting node of the first sensing chip as an adjacent cluster head node according to a grid structure of a predefined wireless sensor network (WSN), and determining the target coordinate data as adjacent coordinate data; minimizing an average spatial distance between coordinate data of the fourth sensing chip and the target coordinate data of the first sensing chip to obtain target coordinate data of the second sensing chip based on the coordinate data-related weight value fusion; wherein the fourth sensing chip and the first sensing chip are located in left and right adjacent positions of the second sensing chip; similarly, performing coordinate data-related weight value fusion on all the sensing chips, and determining target coordinate data of all the sensing chips; and acquiring acceleration data corresponding to the plurality of sensing chips in the current time period; and determining the point location tracking information of all the sensing chips based on the target coordinate data and corresponding acceleration data of all the sensing chips.

The advantageous effect of the present application is that when the adjacent cluster head nodes are fused into the main cluster head node, of the weight values of auxiliary coordinates and main coordinates are fused, so that target tracking of the main cluster head node, i.e., tracking of the first sensing chip, can be achieved according to the adjacent auxiliary cluster head nodes, and finally coordinate data and corresponding acceleration data of the first sensing chip can be achieved. Similarly, point location tracking information of the second, third and fourth sensing chips are obtained, thereby achieving point location tracking of all the sensing chips in the wind power bearing holder.

In a possible implementation, the performing point location-related orthogonal covering on the point location tracking information, specifically includes: performing point location sampling on the target coordinate data corresponding to each sensing chip in the point location tracking information in the current time period based on an orthogonal covering mechanism to obtain location data of multi-point locations related to the target coordinate data; dividing a sampled spatial region corresponding to the point location sampling according to the location data of the multi-point locations; calibrating signal strength of the location data of the multi-point locations through the sampled spatial region to obtain signal strength sequence numbers of the multi-point locations; determining a motion tendency of the location data of the multi-point locations according to the signal strength sequence numbers and a point location density in the sampled spatial region, and determining point location motion tendency data in the current time period with a point location having a greatest signal strength according to the signal strength sequence numbers as a reference point location; and acquiring the acceleration data corresponding to each sensing chip in the point tracking information; and associating the acceleration data and the location data of the multi-point locations in the sampled spatial region in one-to-one correspondence according to the point location motion tendency data, and generating a current circumferential motion trajectory based on the point location tracking information.

The advantageous effect of the present application is that the point location tracking information of each sensing chip is used to determine the sampled spatial region in the current time period, and different signal strength sequence numbers are obtained based on the different distances between each sensing chip in the sampled spatial region and the signal acquisition apparatus, so that the motion tendency of multi-point locations in the current sampled spatial region can be better determined according to the signal strength sequence numbers and the point location density and the point locations in the sampled spatial region, and then combined with the acceleration of each point location to finally form the current circumferential motion trajectory.

In a possible implementation, the performing point location-related motion vector correction and prediction on orthogonally covered point location tracking information to obtain circumferential motion trajectories of the point location, specifically includes: acquiring the orthogonally covered point location tracking information in the current time period; performing coordinate location vector prediction for a next time period on the target coordinate data in the current circumferential motion trajectory based on the acceleration data in the current circumferential motion trajectory according to a Lagrange interpolation function to obtain predicted target coordinate data; performing acceleration vector prediction for the next time period on the acceleration data in the current circumferential motion trajectory according to a locating distance between each point location in the current circumferential motion trajectory to obtain predicted acceleration data; sampling the predicted target coordinate data at predicted point locations; and dividing a predicted sampled spatial region corresponding to the predicted target coordinate data; determining a predicted motion tendency of the multi-point locations in the predicted sampled spatial region according to the signal strength sequence numbers of the predicted point locations and a corresponding predicted point location density in the predicted sampled spatial region; and generating a predicted circumferential motion trajectory based on the next time period according to the predicted point locations in the predicted sampled spatial region and the corresponding predicted acceleration data; and obtaining the circumferential motion trajectories of the point locations based on the predicted circumferential motion trajectory and the current circumferential motion trajectory.

The beneficial effect of the present application is that the coordinate data and the acceleration data of all the point locations in the next time period can be better predicted through the Lagrange interpolation function, and then the predicted circumferential motion trajectory corresponding to the current circumferential motion trajectory is generated for subsequent comparation and prediction of the operation trajectory of the wind power bearing holder.

In a possible implementation, the acquiring an instantaneous vibration circumferential trajectory of the wind power bearing holder according to a vibration acceleration of the wind power bearing holder, specifically includes: acquiring a vibration acceleration in the current time period by means of a vibration sensor in the wind power generator; performing quaternion differentiation division on the motion tendency data in the current circumferential motion trajectory according to a quaternion parameter algorithm to obtain a quaternion differentiation-related operation posture matrix; performing component division on the vibration acceleration in the current time period in each axial direction in a three-dimensional space according to the operation posture matrix to obtain vibration vector coordinate data; performing circumferential curve transient fitting on the vibration acceleration and the vibration vector coordinate data to obtain a transient fitting curve; and matching corresponding locations of the transient fitting curve based on a three-dimensional space where the wind power bearing holder is located, and determining an instantaneous vibration circumferential trajectory in the current time period.

The advantageous effect of the present application is that the vibration acceleration acquired by the vibration sensor preinstalled in the wind power generator is divided in various axial directions, and then the vibration vector data is subjected curve transient fitting to obtain the instantaneous vibration circumferential trajectory related to the vibration acceleration, so as to accurately identify an offset generated due to the vibration of an impeller load and obtain the instantaneous vibration circumferential trajectory of the wind power bearing holder with the offset.

In a possible implementation, the performing irregular trajectory filtering processing on the current circumferential motion trajectory in the circumferential motion trajectories with the instantaneous vibration circumferential trajectory to obtain an ideal circumferential motion trajectory of the wind power bearing holder, specifically includes: performing linear normalization processing on the instantaneous vibration circumferential trajectory and the current circumferential motion trajectory to obtain an instantaneous vibration circumferential curve and a current circumferential curve, respectively; wherein the instantaneous vibration circumferential curve and the current circumferential curve are both spiral circumferential curves; performing difference processing on corresponding coordinate points on the instantaneous vibration circumferential curve and the current circumferential curve to obtain distances of a plurality of coordinate points; and performing median processing on the distances of the plurality of coordinate points to obtain a vibration difference distance; performing curve correction on the current circumferential curve according to the vibration difference distance to obtain a corrected circumferential curve; and performing vector processing on the corrected circumferential curve according to the acceleration data of the current circumferential motion trajectory to determine a corrected circumferential motion trajectory; and filtering out irregular trajectories of the current circumferential motion trajectory within a predefined error range with the corrected circumferential motion trajectory to obtain the ideal circumferential motion trajectory of the wind power bearing holder.

The beneficial effect of the present application is that the error of the current circumferential motion trajectory is corrected with the identified instantaneous vibration circumferential trajectory, and the current circumferential curve is corrected in time according to the vibration difference distance, so that the actual operation condition inside the wind power generator, i.e., the real circumferential motion trajectory of the wind power bearing holder, can be accurately acquired.

In a possible implementation, the generating a corresponding ideal circumferential spatial region and a corresponding predicted circumferential spatial region for the ideal circumferential motion trajectory and the predicted circumferential motion trajectory, respectively; and comparing locations of spatial region probability centroids between the ideal circumferential spatial region and the predicted circumferential spatial region to obtain a predicted coincided spatial region, specifically includes: generating a first spiral cylinder corresponding to the ideal circumferential spatial region and a second spiral cylinder corresponding to the predicted circumferential spatial region, respectively, according to the ideal circumferential motion trajectory and the predicted circumferential motion trajectory; wherein the first spiral cylinder and the second spiral cylinder both contain location information of multi-point locations; acquiring location information of a first point location in the first spiral cylinder; acquiring a point location distribution plane region corresponding to the location information of the first point location according to a saliency of a probability distribution function; and locating a centroid of the first spiral cylinder in the point location distribution plane region via the probability density function to obtain first centroid location information of the first spiral cylinder; locating a centroid of the second spiral cylinder in the point location distribution plane region to obtain second centroid location information of the second spiral cylinder; and performing a three-dimensional spatial coincidence comparison in a same time domain and a same space domain between the first spiral cylinder and the second spiral cylinder according to the first centroid location information and the second centroid location information, and determining a predicted coincided spatial region coinciding with the first spiral cylinder and the second spiral cylinder.

The beneficial effect of the present application is that a motion trajectory quantity with a time component, namely, a spiral cylinder, is constructed according to a circumferential motion trajectory in a three-dimensional space in each time period, and then according to the location of the centroid, coincidence comparison is performed on spatial regions where the spiral cylinders in different time periods are located to obtain a predicted coincided region, thereby facilitating the monitoring of the operation of the wind power bearing holder by predicting the coincidence of the spatial regions in different time periods in a normal situation.

In a possible implementation, the determining whether there is an abnormality in operation of the wind power bearing holder according to the predicted coincided spatial region to obtain operation monitoring information of the wind power bearing, specifically includes: determining a third spiral cylinder related to an actual circumferential spatial region according to an actual circumferential motion trajectory corresponding to the next time period; wherein the actual circumferential motion trajectory is a point location circumferential motion trajectory in the next time period of the ideal circumferential motion trajectory; locating a centroid of the third spiral cylinder in the point location distribution plane region to obtain third centroid location information of the third spiral cylinder; performing three-dimensional spatial coincidence comparison in a same time domain and a same spatial domain between the first spiral cylinder and the third spiral cylinder according to the third centroid location information to obtain a real coincided spatial region; and determining whether there is an abnormality in operation of the wind power bearing holder based on spatial region size determination information of the real coincided spatial region and the predicted coincided spatial region to obtain the operation monitoring information of the wind power bearing to complete operation monitoring of the wind power generator.

In another aspect, an embodiment of the present application further provides a device for monitoring operation of a wind power bearing holder. The device includes: at least one processor; and a memory in communication connection to the at least one processor; wherein the memory stores instructions executable by the at least one processor to enable the at least one processor to perform a method for monitoring operation of a wind power bearing holder according to any items of the described above.

The beneficial effect of the present application is that by monitoring the operation trajectory of the wind power bearing holder in the wind power spindle bearing, a real abnormal operation condition of the wind power bearing holder can be monitored in real time according to the error comparison between the predicted coincided spatial region and the actual coincided spatial region, and then whether there is an abnormality in operation of the wind power spindle and the wind power generator can be predicted, which allows possible fault problems to be timely fed back to maintenance personnel so that they can arrive at the site timely to prevent further deterioration of potential faults. The on-line real-time monitoring and prediction of the operation of the wind power generator is facilitated, thereby reducing the delay time of reporting potential faults of the wind power generator, facilitating rapid maintenance of abnormal wind power generators, reducing maintenance costs, and ensuring the normal power generation efficiency of the wind power generator.

BRIEF DESCRIPTION OF THE DRAWINGS

In order to explain the embodiments of the present application or the technical solutions in the prior art more clearly, the following will briefly introduce the drawings which need to be used in the embodiments or the description of the prior art. Obviously, the drawings in the following description are merely some embodiments of the present application, and it would have been obvious for a person skilled in the art to obtain other drawings according to these drawings without involving any inventive effort. In the drawings.

DETAILED DESCRIPTION OF THE EMBODIMENTS

In order to enable a person skilled in the art to better understand the technical solution of the present application, a clear and complete description of the technical solution of the embodiments of the present application will be provided below in conjunction with the accompanying drawings of the embodiments of the present application, and it is obvious that the embodiments described are only a part of the embodiments of the present application, rather than all the embodiments. Based on the embodiments of this description, all other embodiments obtained by a person skilled in the art without involving any inventive effort should fall within the scope of protection of the present application.

Figure 1:
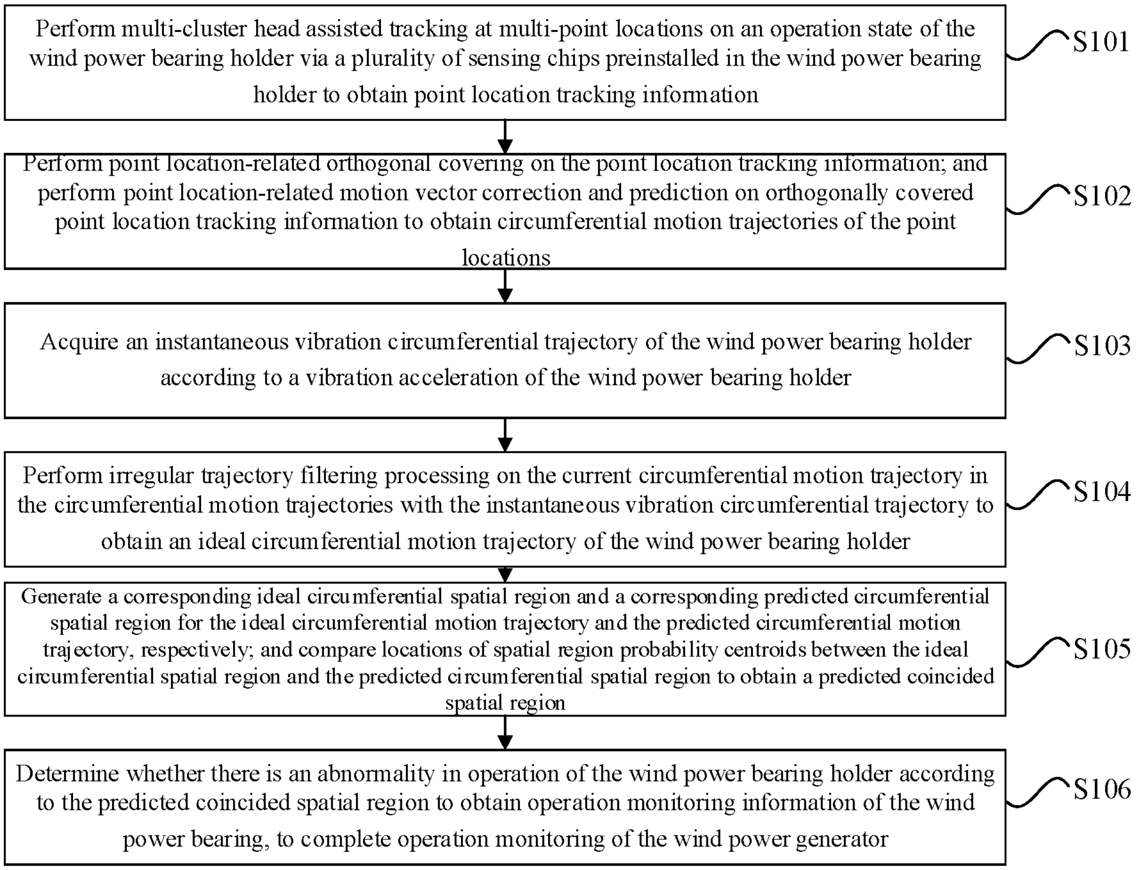
FIG. 1 is a flowchart of a method for monitoring operation of a wind power bearing holder according to an embodiment of the present application.

An embodiment of the present application provides a method for monitoring operation of a wind power bearing holder. As shown in FIG. 1, the method for monitoring operation of a wind power bearing holder specifically includes steps S101-S106.

Figure 2:
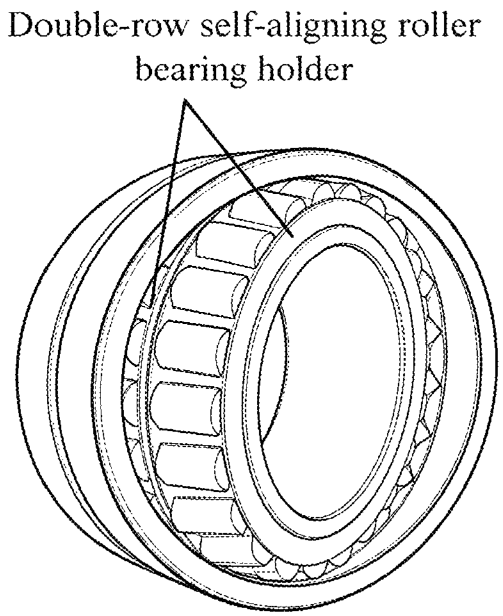
FIG. 2 is a schematic diagram showing a double-row self-aligning roller bearing according to an embodiment of the present application.

It should be noted that for a wind power transmission spindle of a wind power generator in a wind power generation device, there are two wind power bearings, and a double-row self-aligning roller bearing is generally used. Alternatively, for example, FIG. 2 is a schematic diagram showing a double-row self-aligning roller bearing according to an embodiment of the present application, and as shown in FIG. 2, the self-aligning roller bearing has double rows of balls therein and fixedly held by a bearing holder. During the operation of the wind power generator, the spindle will bear a certain load pressure, so that the centroid of the spindle will deflect, so the spindle may have a certain offset according to the features of the self-aligning roller bearing, and the wind power bearing holder may also perform a certain motion deflection with the offset of the spindle, that is, not only horizontal rotation, but also offsets in all directions, so monitoring the motion trajectory of the wind power bearing holder can achieve the operation monitoring of the wind power bearing, so that it can better reflect the operation of the wind power spindle, and thus reflect the operation of the whole wind power generator.

S101: Multi-cluster head assisted tracking is performed at multi-point locations on an operation state of the wind power bearing holder via a plurality of sensing chips pre-installed in the wind power bearing holder to obtain point location tracking information. The point location tracking information includes: target coordinate data and corresponding acceleration data of all sensing chips in any time period.

Specifically, signal acquisition is performed on the plurality of sensing chips in the wind power bearing holder via a signal acquisition apparatus in a wind power generator to determine whether the wind power bearing holder is in operation. The plurality of sensing chips are embedded to be uniformly distributed in the wind power bearing holder to enable the wind power bearing holder to achieve a rotational balance. In a case that the wind power bearing holder is in operation, a signal transmitting node of a first sensing chip in operation is determined as a main cluster head node, and signal transmitting nodes of a second sensing chip and a third sensing chip are determined as adjacent cluster head nodes. The second sensing chip and the third sensing chip are located at left and right adjacent positions of the first sensing chip, respectively.

Figure 4:
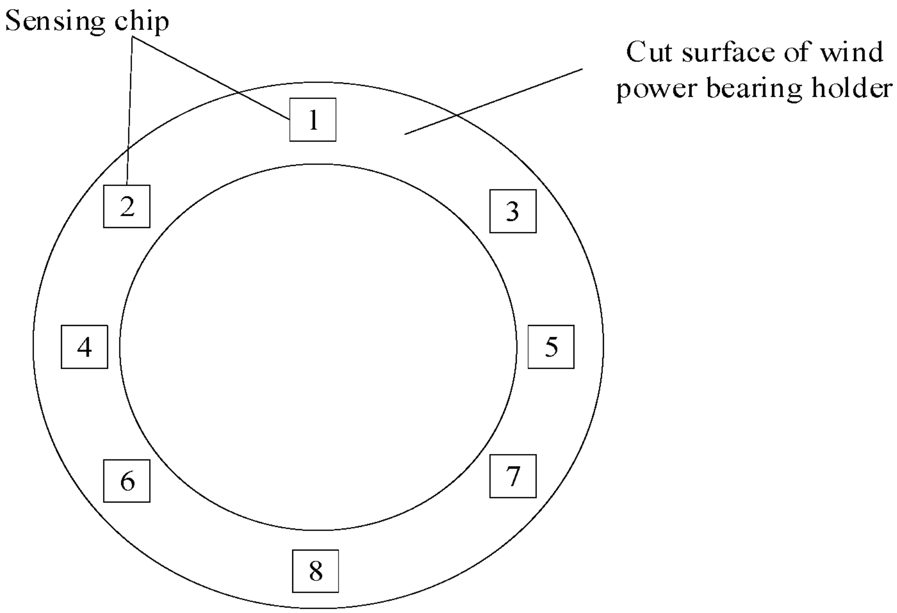
FIG. 4 is a schematic diagram showing a sensing chip distribution of a wind power bearing holder according to an embodiment of the present application.

In an embodiment, FIG. 4 is a schematic diagram showing the distribution of sensing chips of a wind power bearing holder provided in an embodiment of the present application. As shown in FIG. 4, when a wind power bearing holder with a double-row self-aligning roller bearing is prepared, a plurality of sensing chips are put into the wind power bearing holder through a stamping process or an integral manufacturing process, and are uniformly distributed inside the holder, so that the holder in operation can meet dynamic balance requirements, ensuring the normal and stable operation of the holder. Then, according to the arrangement method shown in FIG. 4, eight sensing chips are arranged at one time on the left and right sides. At the same time, the sensing chip has a signal transmission function of transmitting real-time coordinate data and acceleration data, so that the signal acquisition apparatus acquires the transmitted signal.

Figure 3:
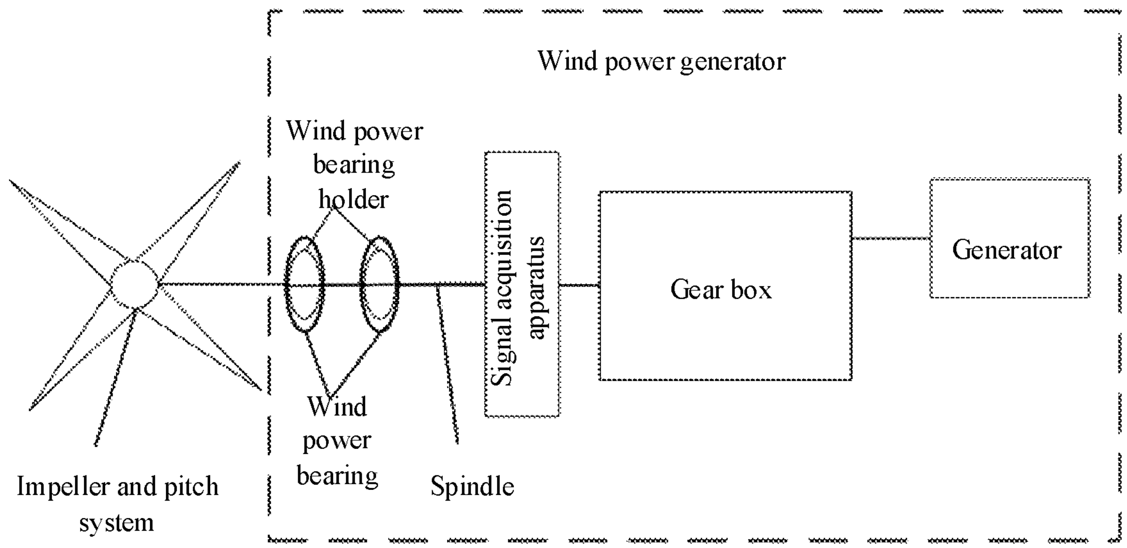
FIG. 3 is a schematic diagram showing a structure for monitoring the operation of a wind power bearing according to an embodiment of the present application.

In an embodiment, FIG. 3 is a schematic diagram showing a structure for monitoring operation of a wind power bearing provided by an embodiment of the present application. As shown in FIG. 3, the wind power bearing holder in operation is subjected to multi-cluster head assisted tracking at multi-point locations via a signal server connected to a signal acquisition apparatus in the wind power generator. At the same time, cluster heads of different levels are used to complete different tasks in different stages to improve the locating and tracking accuracy of the sensing chips and reduce the target loss rate of the point locations. The cluster heads include: a main cluster head node and auxiliary cluster head nodes.

Further, three-dimensional spatial distance calculation with received signal carrier powers is performed on the main cluster head node and the adjacent cluster head nodes based on a predefined time period according to a predefined received signal strength Indicator (RSSI) algorithm to obtain main coordinate data and adjacent coordinate data in a current time period. The main coordinate data and the adjacent coordinate data are three-dimensional coordinate data.

In an embodiment, a signal receiving apparatus calculates a relative distance with received signal carrier powers between the determined main cluster head node and adjacent cluster head nodes based on the RSSI algorithm:

$$d_y = d_0 * 10\frac{P_0 - P_y}{\alpha},\ d_x = d_0 * 10\frac{P_0 - P_x}{\beta} \text{ and } d_z = d_0 * 10\frac{P_0 - P_z}{\gamma},$$

wherein α, β, and γ are coordinate reference intermediate quantities, $P_0$ is a carrier power of a standard signal, $P_y$, $P_x$, and $P_z$ are carrier powers of y, x and z axes respectively, and $d_0$ is a predefined receiving distance of the standard signal, and then main coordinate data and adjacent coordinate data in the current time period are determined.

Further, an average spatial distance of the adjacent coordinate data in the current time period is minimized according to a least squares algorithm, and median value-related calculation is performed on a minimized spatial distance to obtain auxiliary coordinate data.

In an embodiment, two adjacent coordinate data in the current time period are represented by matrixes of variable locations, and a matrix A related to the second sensing chip and a matrix B corresponding to the third sensing chip are obtained, respectively. There may be a ranging error, so by adding a random error vector and combining with the least squares algorithm, the average spatial distance between the matrix A and the matrix B is minimized, and then the minimized spatial distance is subjected to a median value derivation to finally obtain the auxiliary coordinate data of two mutually mapped adjacent coordinates.

Further, coordinate data-related weight value fusion is performed on auxiliary coordinate data of the adjacent cluster head nodes and main coordinate data of the main cluster head node in the current time period to obtain target coordinate data of the first sensing chip.

As a possible implementation, the auxiliary coordinate data of the adjacent cluster head nodes is sent to the main cluster head node, and then the auxiliary coordinate data and the main coordinate data are de-weighted and divided as the proportions of their weights are different, i.e., the auxiliary coordinate data is fused into the main coordinate data to reduce the tracking and locating errors caused in the process of only tracking and locating the first sensing chip, thus ensuring the accuracy of the locating and tracking of the main coordinate data of the main cluster head node.

Further, similarly, the signal transmitting node of the first sensing chip is determined as an adjacent cluster head node according to a grid structure of a predefined wireless sensor network (WSN), and the target coordinate data is determined as adjacent coordinate data. An average spatial distance between coordinate data of a fourth sensing chip and the target coordinate data of the first sensing chip is minimized to obtain target coordinate data of the second sensing chip based on the coordinate data-related weight value fusion. The fourth sensing chip and the first sensing chip are located in left and right adjacent positions of the second sensing chip. Similarly, coordinate data-related weight value fusion is performed on all the sensing chips, and target coordinate data of all the sensing chips is determined. Acceleration data corresponding to the plurality of sensing chips in the current time period is acquired. Then the point location tracking information of all the sensing chips is finally determined based on the target coordinate data and corresponding acceleration data of all the sensing chips.

As a possible implementation, as shown in FIG. 4, the point location tracking of remaining sensors is performed sequentially according to the point location tracking of the first sensing chip. By analogy, the second sensing chip, the third sensing chip, the fourth sensing chip, etc. are sequentially determined as a main cluster head node, and corresponding adjacent sensing chips are sequentially determined as adjacent cluster head nodes to finally obtain target coordinate data of each sensing chip, then according to the time period where each sensing chip is in, acceleration data of each sensing chip in the corresponding time period is acquired, and the acceleration data and the target coordinate data of each sensing chip are finally determined as the point location tracking information of the point location where the sensing chip is located.

S102: Point location-related orthogonal covering is performed on the point location tracking information. Then, point location-related motion vector correction and prediction is performed on orthogonally covered point location tracking information to obtain circumferential motion trajectories of the point location. The circumferential motion trajectories include: a current circumferential motion trajectory and a predicted circumferential motion trajectory.

Specifically, point location sampling is performed on the target coordinate data corresponding to each sensing chip in the point location tracking information in the current time period based on an orthogonal covering mechanism to obtain location data of multi-point locations related to the target coordinate data. According to the location data of the multi-point locations, a sampled spatial region corresponding to the point location sampling is divided.

In an embodiment, for any two samples extracted from the point location tracking information, the three-dimensional coordinates corresponding to the two point locations are sampled and divided, and then the above-mentioned two point locations are orthogonally covered according to an orthogonal mechanism, i.e., sample point 1 ($X_1$, $Y_1$, $Z_1$) and sample point 2 ($X_2$, $Y_2$, $Z_2$); and location data of multi-point locations is obtained according to $X_{fin}=\beta X_1+\alpha X_2$, $Y_{fin}=\beta Y_1+\alpha Y_2$, and $Z_{fin}=\beta Z_1+\alpha Z_2$, i.e., the multi-point location coordinates ($X_{fin}$, $Y_{fin}$, and $Z_{fin}$) in the location data; and then the sampled spatial region corresponding to the sampled point locations is divided according to the sampled and extracted location data, where α and β are orthogonally covered intermediate quantities.

Further, signal strength of the location data of the multi-point locations is calibrated through the sampled spatial region to obtain signal strength sequence numbers of the multi-point locations. Then a motion tendency of the location data of the multi-point locations is determined according to the signal strength sequence numbers and a point location density in the sampled spatial region, and point location motion tendency data in the current time period is determined with a point location having a greatest signal strength according to the signal strength sequence numbers as a reference point location.

In an embodiment, according to $$P(N) = L\frac{\varepsilon(d1 - d0)^2}{\mu},$$

the signal strength of the location data of the sampled region is determined to obtain a signal strength sequence number P(N) of each point location, where L is a point location density, μ is a sampled spatial region, d1 is a signal receiving distance between the point location and the signal acquisition apparatus, d0 is an inherent error distance, ε is a signal frequency parameter. Then, according to the signal strength sequence number of each point location, each point location is correspondingly marked, then according to the sequence number of the mark, the motion tendency of the location data of the multi-point locations is determined, and the point location with the greatest signal strength is taken as the reference point location. Finally, the point location motion tendency data in the current time period is determined.

Further, the acceleration data corresponding to each sensing chip in the point location tracking signal is first acquired. The acceleration data, and the location data of the multi-point locations in the sampled spatial region are associated in one-to-one correspondence according to the point location motion tendency data to generate a current circumferential motion trajectory based on the point location tracking information.

Further, the orthogonally covered point location tracking information in the current time period is acquired. Coordinate location vector prediction for a next time period is performed on the target coordinate data in the current circumferential motion trajectory based on the acceleration data in the current circumferential motion trajectory according to a Lagrange interpolation function to obtain predicted target coordinate data.

In an embodiment, wireless sensor network (WSN)-based point location coordinates in the orthogonally covered point location tracking information are all one-time coordinates, and the WSN point location coordinates in the next time period may move into a new coverage region. Since the mobile wireless sensor network nodes are in a low-speed state, and the coverage radius is generally not less than 10 m, the point location tracking information within a time period of 1 s can all be within the orthogonal coverage region of the sampled spatial region in the time period. Then, assuming that the coordinates corresponding to a k-period are ($X_k$, $Y_k$, and $Z_k$), the Lagrange interpolation function L(k) performs value prediction corresponding to the k-period. That is, the Lagrange interpolation function L(k) is used to perform Lagrange prediction by acquiring the target coordinate data in the current k-period to obtain predicted target coordinate data ($X_{k+1}$, $Y_{k+1}$, and $Z_{k+1}$) in a (k+1)-period.

As a possible implementation, according to $$L(i) = \frac{\sum_{k=0}^{i}[L(k-2) - L(k-3)]}{\sum_{k=0}^{i}(t_k - t_{k-1})},$$

a Lagrange interpolation function L(i) in the current k-period is obtained, where $t_k$ is an amount of time for the k-period, $t_{k-1}$ is an amount of time for a (k−1)-period, and L is a point location density. Then, according to the coordinate value of the x-axis of the k-period: $X_k=L(t)=L_1X_{k-1}+L_2X_{k-2}$, where L(t) is a Lagrange interpolation function at time t, i.e., the x-axis coordinate $X_{k+1}$ in the (k+1)-period can be further obtained. Similarly, a y-axis coordinate and a z-axis coordinate in the (k+1)-period are obtained, and finally the predicted target coordinate data ($X_{k+1}$, $Y_{k+1}$, and $Z_{k+1}$) in the (k+1)-period is obtained.

Further, acceleration vector prediction for the next time period is performed on the acceleration data in the current circumferential motion trajectory according to a locating distance between each point location in the current circumferential motion trajectory to obtain predicted acceleration data. The predicted target coordinate data is then sampled at predicted point locations. A predicted sampled spatial region corresponding to the predicted target coordinate data is divided.

In an embodiment, with a marginal value $d_i$ in each axial direction of each orthogonally covered node in the current circumferential motion trajectory in the sampled spatial region, a locating distance $R_i$ between each point location in the current circumferential motion trajectory is obtained according to $R_i=\min(r, d_i)$, where r is a standard radius distance of each node. Then acceleration vector prediction for the (k+1)-period is performed on the acceleration data in the current circumferential motion trajectory using the Lagrange interpolation function L(i) in the current k-period to obtain an acceleration vector in each axial direction, i.e., an x axis, a y axis and a z axis, and a predicted speed in the (k+1)-period; and then the speeds in the three axial directions are subjected to vector addition to obtain acceleration data at each point location in the (k+1)-period, wherein the x axis and the y axis are coordinate axes of a ball bearing in the same plane, and the z axis is the direction of the wind power spindle.

Further, a predicted motion tendency of multi-point locations in the predicted sampled spatial region is determined according to the signal strength sequence numbers of the predicted point locations and a corresponding predicted point location density in the predicted sampled spatial region. A predicted circumferential motion trajectory in the next time period is generated after matching the predicted acceleration data with the predicted point locations in the predicted sampled spatial region. The circumferential motion trajectories of the point locations are obtained based on the predicted circumferential motion trajectory and the current circumferential motion trajectory.

As a possible implementation, after the predicted target coordinate data and the corresponding acceleration data are obtained, point location sampling for the next time period is performed on the predicted target coordinate data corresponding to each sensing chip in the predicted point location tracking information to obtain location data of multiple predicted point locations related to the predicted target coordinate data. Then, a predicted sampled spatial region is divided corresponding to the point location sampling according to the location data of the predicted point locations. Signal strength of the location data of the multiple predicted point locations is calibrated through the predicted sampled spatial region to obtain signal strength sequence numbers related to the multiple predicted point locations. Then, a predicted motion tendency of the location data of multi-point locations is determined according to the signal strength sequence numbers and a point location density in the predicted sampled spatial region, and a predicted circumferential motion trajectory in the next time period is generated after matching the obtained predicted acceleration data with the predicted point locations in the predicted sampled spatial region.

S103: An instantaneous vibration circumferential trajectory of the wind power bearing holder is acquired according to a vibration acceleration of the wind power bearing holder.

Specifically, a vibration acceleration in the current time period is first acquired by means of a vibration sensor in the wind power generator. Then quaternion differentiation division is performed on the motion tendency data in the current circumferential motion trajectory according to a quaternion parameter algorithm to obtain a quaternion differentiation-related operation posture matrix.

Further, component division is performed on the vibration acceleration in the current time period in each axial direction in a three-dimensional space according to the operation posture matrix to obtain vibration vector coordinate data. Then, circumferential curve transient fitting is performed on the vibration acceleration and the vibration vector coordinate data to obtain a transient fitting curve.

Further, corresponding locations of the transient fitting curve are matched based on a three-dimensional space where the wind power bearing holder is located to determine the transient vibration circumferential trajectory in the current time period.

In an embodiment, firstly, the vibration acceleration in the current time period is acquired according to the vibration sensor in the wind power generator; the motion tendency data in the current circumferential motion trajectory is subjected to coordinate conversion according to a conversion relationship between absolute coordinates and relative coordinates using the quaternion, i.e., the target coordinate data and the acceleration data of each point location are converted to generate a quaternion difference equation; and then the quaternion difference equation is subjected to matrix transformation to generate a quaternion differentiation-related operation posture matrix.

In an embodiment, the vibration acceleration in the current time period is divided into components of an x-axis, a y-axis and a z-axis based on the quaternary parameters in the operation posture matrix to generate a vibration acceleration component matrix related to the axial directions, and then, through integration operation, the vibration acceleration component matrix is subjected to circumferential curve transient fitting to obtain a transient fitting curve, and then corresponding point locations in the transient fitting curve and a three-dimensional space where the current circumferential motion trajectory is located are subjected to one-to-one matching in a same time period with, so that the transient fitting curve and the current circumferential motion trajectory are located in a circumferential spatial region in a same time domain and a same space domain; and a transient vibration circumferential motion trajectory in the current time period is determined based on the corresponding vibration acceleration and the transient fitting circumferential motion trajectory.

S104: Irregular trajectory filtering processing is performed on the current circumferential motion trajectory in the circumferential motion trajectories with the instantaneous vibration circumferential trajectory to obtain an ideal circumferential motion trajectory of the wind power bearing holder.

Specifically, linear normalization processing is performed on the instantaneous vibration circumferential trajectory and the current circumferential motion trajectory to obtain an instantaneous vibration circumferential curve and a current circumferential curve, respectively. The instantaneous vibration circumferential curve and the current circumferential curve are both spiral circumferential curves.

Further, difference processing is performed on corresponding coordinate points on the instantaneous vibration circumferential curve and the current circumferential curve to obtain distances between a plurality of coordinate points. Median processing is performed on distances of the plurality of coordinate points to obtain a vibration difference distance.

Further, curve correction is performed on the current circumferential curve according to the vibration difference distance to obtain a corrected circumferential curve. Vector processing is performed on the corrected circumferential curve according to the acceleration data of the current circumferential motion trajectory to determine a corrected circumferential motion trajectory. Then, irregular trajectories of the current circumferential motion trajectory within a predefined error range are filtered out with the corrected circumferential motion trajectory to obtain the ideal circumferential motion trajectory of the wind power bearing holder.

In an embodiment, the instantaneous vibration circumferential trajectory and the current circumferential motion trajectory are first subjected to linear normalization processing to obtain the instantaneous vibration circumferential curve and the current circumferential curve for comparison and calculation. Then based on the difference between corresponding coordinate points of the instantaneous vibration circumferential curve and the current circumferential curve, the vibration difference distance of each point location is determined, so as to eliminate vibration of the current circumferential curve and ensure the uniformity and integrity of the current circumferential curve, and then the irregular trajectories of the current circumferential motion trajectory within the predefined error range are filtered out with the corrected circumferential motion trajectory to obtain the ideal circumferential motion trajectory of the wind power bearing holder.

S105: A corresponding ideal circumferential spatial region and a corresponding predicted circumferential spatial region are generated for the ideal circumferential motion trajectory and the predicted circumferential motion trajectory, respectively. Then, locations of spatial region probability centroids are compared between the ideal circumferential spatial region and the predicted circumferential spatial region to obtain a predicted coincided spatial region.

Specifically, a first spiral cylinder corresponding to the ideal circumferential spatial region and a second spiral cylinder corresponding to the predicted circumferential spatial region are generated, respectively, according to the ideal circumferential motion trajectory and the predicted circumferential motion trajectory. The first spiral cylinder and the second spiral cylinder both location information of multi-point locations.

Further, location information of a first point location in the first helical cylinder is acquired. Then, a point location distribution plane region corresponding to the location information of the first point location is acquired according to the saliency of the probability distribution function. A centroid of the first spiral cylinder in the point location distribution plane region is located via the probability density function to obtain first centroid location information of the first spiral cylinder. Then, a centroid of the second spiral cylinder in the point location distribution plane region is located to obtain second centroid location information of the second spiral cylinder.

Further, a three-dimensional spatial coincidence comparison is performed in a same time domain and a same space domain between the first spiral cylinder and the second spiral cylinder according to the first centroid location information and the second centroid location information, and a predicted coincided spatial region coinciding with the first spiral cylinder and the second spiral cylinder is determined.

In an embodiment, according to the data representation of the ideal circumferential motion trajectory and the predicted circumferential motion trajectory in the three-dimensional space, the first spiral cylinder corresponding to the ideal circumferential spatial region and the second spiral cylinder corresponding to the predicted circumferential spatial region are generated, respectively. The spatial locations and the spiral angles of the spiral cylinders are different in different time periods. Then the first point location information of the first spiral cylinder is subjected to significance recognition according to the saliency of the probability distribution function, and then the point location distribution plane region corresponding to the first point location information is acquired. Then the centroid of the spiral cylinder in the point location distribution plane region is located through the probability density function, and the centroid location data of the first spiral cylinder is identified to obtain the first centroid location information of the first spiral cylinder.

Similarly, the centroid of the second spiral cylinder in the point location distribution plane region is located, and the centroid location data of the second spiral cylinder is identified to finally obtain the second centroid location information of the second spiral cylinder.

As a possible implementation, according to the first centroid location information and the second centroid location information, the first spiral cylinder and the second spiral cylinder are subjected spiral cylinder moving processing correspondingly in the three-dimensional space in the same time domain and the same space domain, then the first spiral cylinder and the second spiral cylinder are overlapped in spatial volume according to the location of each corresponding point location, and then a mutually coincided predicted coincided spatial region between the first spiral cylinder and the second spiral cylinder is determined to identify trajectory parts of identical circumferential trajectories of the ideal circumferential motion trajectory and the predicted circumferential motion trajectory, and eliminate the trajectory parts of different circumferential trajectories.

S106: Whether there is an abnormality in operation of the wind power bearing holder is determined according to the predicted coincided spatial region to obtain operation monitoring information of the wind power bearing to complete the operation monitoring of the wind power generator.

Specifically, a third spiral cylinder related to an actual circumferential spatial region is determined according to an actual circumferential motion trajectory corresponding to the next time period. The actual circumferential motion trajectory is a point location circumferential motion trajectory in the next time period of the ideal circumferential motion trajectory.

Further, a centroid of the third spiral cylinder in the point location distribution plane region is located to obtain third centroid location information of the third spiral cylinder.

Further, three-dimensional spatial coincidence comparison in a same time domain and a same spatial domain is performed between the first spiral cylinder and the third spiral cylinder according to the third centroid location information to obtain a real coincided spatial region.

Further, whether there is an abnormality in operation of the wind power bearing holder is determined based on spatial region size determination information of the real coincided spatial region and the predicted coincided spatial region to obtain the operation monitoring information of the wind power bearing to complete the operation monitoring of the wind power generator.

In an embodiment, the corresponding actual circumferential motion trajectory in the next time period is acquired first, and the third spiral cylinder related to the actual circumferential spatial region, i.e., a spiral cylinder corresponding to the operation trajectory of the wind power bearing holder in the next time period is constructed; and then the third spiral cylinder is compared with the first spiral cylinder in the current time period in terms of the space volume related to the centroid location information to obtain a real coincided spatial region between the first spiral cylinder and the third spiral cylinder, i.e., the actual point location circumferential motion trajectory of the wind power bearing holder from the current time period to the next time period. Then, the real coincided spatial region and the predicted coincided spatial region are compared in a same time domain and a same space domain to obtain a three-dimensional space coincidence degree, and the higher the coincidence degree is, the more the operation condition of the wind power bearing holder is consistent with the normal operation condition, namely, the more the operation condition of the wind power bearing is consistent with the normal operation condition. On the contrary, the lower the coincidence degree is, the more the operation condition of the wind power bearing holder deviates from the normal operation condition, and the more obvious the abnormal condition of the wind power bearing is, the more likely the potential fault is to be caused. Finally, the operation monitoring information of the wind power bearing is sent to the maintenance personnel through a server of the wind power generator, and the real-time operation monitoring of the wind power generator is realized. The potential fault under abnormal operation can be timely found out, and the maintenance personnel is enabled to make the maintenance plan in advance, so as prevent a further development of the fault of the wind power generator, and solve the potential abnormal risk that may cause large faults in advance.

Figure 5:
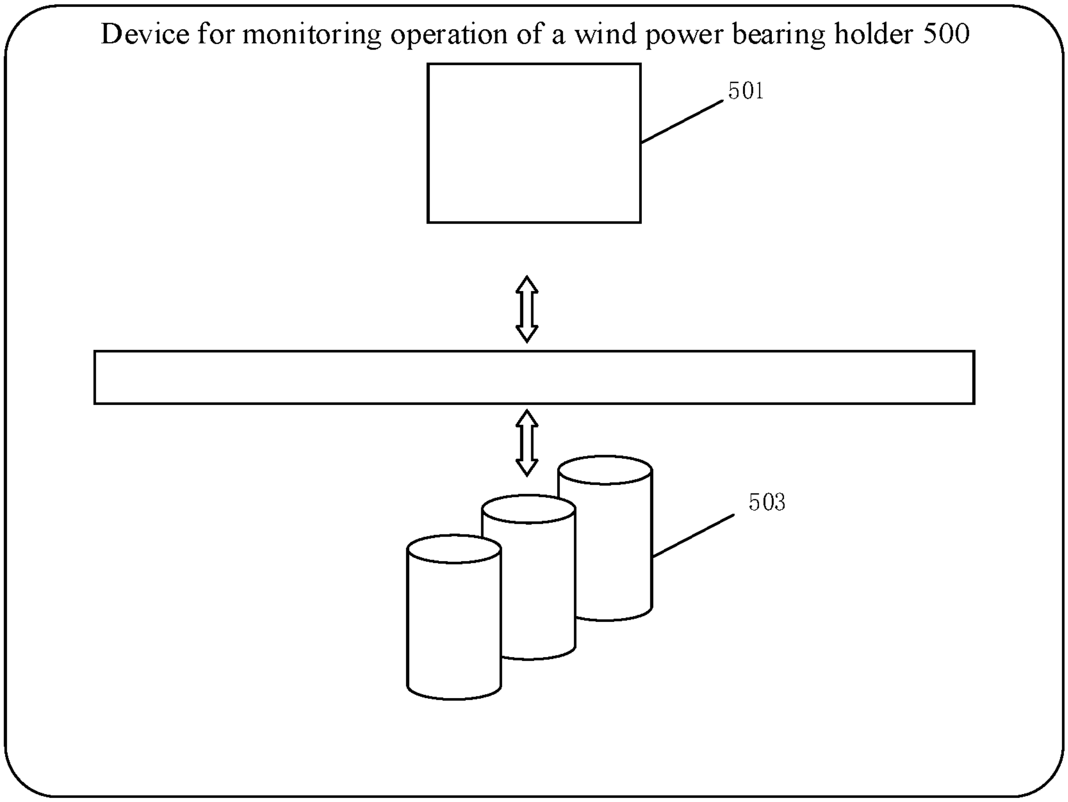
FIG. 5 is a schematic diagram showing a device for monitoring operation of a wind power bearing holder according to an embodiment of the present application.

In addition, an embodiment of the present application further provides a device for monitoring operation of a wind power bearing holder. As shown in FIG. 5, the device for monitoring operation of a wind power bearing holder 500 specifically includes:

at least one processor 501; and a memory 502 in communication connection to the at least one processor. The memory 502 stores instructions executable by the at least one processor 501 to enable the at least one processor 501 to:

perform multi-cluster head assisted tracking at multi-point locations on an operation state of the wind power bearing holder via a plurality of sensing chips preinstalled in the wind power bearing holder to obtain point location tracking information; where the point location tracking information includes: target coordinate data and corresponding acceleration data of all sensing chips in any time period;

perform point location-related orthogonal covering on the point location tracking information; and perform point location-related motion vector correction and prediction on orthogonally covered point location tracking information to obtain circumferential motion trajectories of the point locations; where the circumferential motion trajectories include: a current circumferential motion trajectory and a predicted circumferential motion trajectory;

acquire an instantaneous vibration circumferential trajectory of the wind power bearing holder according to a vibration acceleration of the wind power bearing holder;

perform irregular trajectory filtering processing on the current circumferential motion trajectory in the circumferential motion trajectories with the instantaneous vibration circumferential trajectory to obtain an ideal circumferential motion trajectory of the wind power bearing holder;

generate a corresponding ideal circumferential spatial region and a corresponding predicted circumferential spatial region for the ideal circumferential motion trajectory and the predicted circumferential motion trajectory, respectively; and compare locations of spatial region probability centroids between the ideal circumferential spatial region and the predicted circumferential spatial region to obtain a predicted coincided spatial region; and determine whether there is an abnormality in operation of the wind power bearing holder according to the predicted coincided spatial region to obtain operation monitoring information of the wind power bearing, to complete operation monitoring of the wind power generator.

The beneficial effect of the present application is that by monitoring the operation trajectory of the wind power bearing holder in the wind power spindle bearing, a real abnormal operation condition of the wind power bearing holder can be monitored in real time according to the error comparison between the predicted coincided spatial region and the actual coincided spatial region, and then whether there is an abnormality in operation of the wind power spindle and the wind power generator can be predicted, which allows possible fault problems to be timely fed back to maintenance personnel so that they can arrive at the site timely to prevent further deterioration of potential faults. The on-line real-time monitoring and prediction of the operation of the wind power generator is facilitated, thereby reducing the delay time of reporting potential faults of the wind power generator, facilitating rapid maintenance of abnormal wind power generators, reducing maintenance costs, and ensuring the normal power generation efficiency of the wind power generator.

The various embodiments of the present application are described in a progressive manner, reference may be made to the same and similar parts of the various embodiments, and each of the embodiments focuses on the differences from the other embodiments. Device and non-volatile computer storage media embodiments are described briefly because they are substantially similar to method embodiments, and related parts are as described with respect to method embodiments.

Embodiments of the present application have been described above. In some cases, the acts or steps recited in the description may be performed in an order other than that of the embodiments and still achieve the desired results. Additionally, the processes depicted in the figures do not necessarily require a particular order or sequential order shown to achieve desired results. Multi-tasking and parallel processing are also possible or may be advantageous in some embodiments.

The foregoing is by way of example only and is not intended as limiting. Various modifications and changes to the embodiments of the present application will be apparent to a person skilled in the art. Any modifications, equivalents, improvements, etc. that come within the spirit and scope of the embodiments of the invention are intended to be included within the description of the invention.

What is claimed is:

1. A method for monitoring operation of a wind power bearing holder, comprising:

during operation of a wind power generator including the wind power bearing holder in a wind power spindle bearing, performing multi-cluster head assisted tracking at multi-point locations on an operation state of the wind power bearing holder by a signal server connected to a signal acquisition apparatus in the wind power generator via a plurality of sensing chips preinstalled in the wind power bearing holder to obtain point location tracking information, further comprising:

performing signal acquisition on the plurality of sensing chips in the wind power bearing holder via the signal acquisition apparatus in the wind power generator to determine whether the wind power bearing holder is in operation; wherein the plurality of sensing chips are embedded inside the wind power bearing holder to enable the wind power bearing holder to achieve a rotational balance, wherein each sensing chip has a signal transmission function of transmitting real-time coordinate data and acceleration data to the signal acquisition apparatus, and a uniform distribution enables the wind power bearing holder in operation to meet dynamic balance requirements;

in a case that the wind power bearing holder is in operation, determining a signal transmitting node of a first sensing chip in operation as a main cluster head node, and determining signal transmitting nodes of a second sensing chip and a third sensing chip as adjacent cluster head nodes; wherein the second sensing chip and the third sensing chip are located at left and right adjacent positions of the first sensing chip, respectively;

performing three-dimensional spatial distance calculation with received signal carrier powers received by the signal acquisition apparatus from signals transmitted by the main cluster head node and the adjacent cluster head nodes based on a predefined time period according to a predefined received signal strength indicator (RSSI) algorithm to obtain main coordinate data and adjacent coordinate data in a current time period; wherein the main coordinate data and the adjacent coordinate data are both three-dimensional coordinate data representing locations of corresponding sensing chips in the current time period;

minimizing an average spatial distance of the adjacent coordinate data in the current time period according to a least squares algorithm, and performing median value-related calculation on a minimized spatial distance to obtain auxiliary coordinate data; and determining point location tracking information for all sensing chips based on the auxiliary coordinate data and target coordinate data of the first sensing chip; wherein the point location tracking information comprises: target coordinate data and corresponding acceleration data of all sensing chips in any time period;

performing point location-related orthogonal covering on the point location tracking information, further comprising:

performing point location sampling on the target coordinate data of all sensing chips in the point location tracking information in the current time period based on an orthogonal covering mechanism to obtain location data of multi-point locations related to the target coordinate data of all sensing chips;

dividing a sampled spatial region corresponding to the point location sampling according to the location data of the multi-point locations;

calibrating signal strength of the location data of the multi-point locations through the sampled spatial region based on distances between the sensing chips at the multi-point locations and the signal acquisition apparatus to obtain signal strength sequence numbers of the multi-point locations;

determining a motion tendency of the location data of the multi-point locations according to the signal strength sequence numbers of the multi-point locations and a point location density in the sampled spatial region, and determining point location motion tendency data in the current time period with a point location having a greatest signal strength according to the signal strength sequence numbers of the multi-point locations as a reference point location; and acquiring the acceleration data corresponding to each sensing chip in the point location tracking information; and associating the acceleration data and the location data of the multi-point locations in the sampled spatial region in one-to-one correspondence according to the point location motion tendency data, and generating a current circumferential motion trajectory based on the point location tracking information;

performing point location-related motion vector correction and prediction on orthogonally covered point location tracking information to obtain circumferential motion trajectories of the point locations, further comprising:

acquiring the orthogonally covered point location tracking information in the current time period;

performing coordinate location vector prediction for a next time period on the target coordinate data of all sensing chips in the current circumferential motion trajectory based on the acceleration data in the current circumferential motion trajectory according to a Lagrange interpolation function to obtain predicted target coordinate data;

performing acceleration vector prediction for the next time period on the acceleration data in the current circumferential motion trajectory according to a locating distance between each point location in the current circumferential motion trajectory to obtain predicted acceleration data;

sampling the predicted target coordinate data at predicted point locations; and dividing a predicted sampled spatial region corresponding to the predicted target coordinate data;

determining a predicted motion tendency of multi-point locations in the predicted sampled spatial region according to signal strength sequence numbers of the predicted point locations and a corresponding predicted point location density in the predicted sampled spatial region; and generating a predicted circumferential motion trajectory in the next time period according to the predicted point locations in the predicted sampled spatial region and the corresponding predicted acceleration data; and obtaining the circumferential motion trajectories of the point locations based on the predicted circumferential motion trajectory and the current circumferential motion trajectory; wherein the circumferential motion trajectories comprise: the current circumferential motion trajectory and the predicted circumferential motion trajectory;

acquiring an instantaneous vibration circumferential trajectory of the wind power bearing holder according to a vibration acceleration of the wind power bearing holder, further comprising:

acquiring a vibration acceleration in the current time period by means of a vibration sensor preinstalled in the wind power generator;

performing quaternion differentiation division on the motion tendency data in the current circumferential motion trajectory according to a quaternion parameter algorithm to obtain a quaternion differentiation-related operation posture matrix;

performing component division on the vibration acceleration in the current time period in each axial direction in a three-dimensional space according to the quaternion differentiation-related operation posture matrix to obtain vibration vector coordinate data;

performing circumferential curve transient fitting on the vibration acceleration and the vibration vector coordinate data to obtain a transient fitting curve; and matching corresponding locations of the transient fitting curve based on a three-dimensional space where the wind power bearing holder is located by one-to-one matching corresponding point locations in the transient fitting curve with point locations in a three-dimensional space where the current circumferential motion trajectory is located in a same time period, so that the transient fitting curve and the current circumferential motion trajectory are located in a circumferential spatial region in a same time domain and a same space domain, and determining an instantaneous vibration circumferential trajectory in the current time period;

performing irregular trajectory filtering processing on the current circumferential motion trajectory in the circumferential motion trajectories with the instantaneous vibration circumferential trajectory to obtain an ideal circumferential motion trajectory of the wind power bearing holder, further comprising:

performing linear normalization processing on the instantaneous vibration circumferential trajectory and the current circumferential motion trajectory to obtain an instantaneous vibration circumferential curve and a current circumferential curve, respectively; wherein the instantaneous vibration circumferential curve and the current circumferential curve are both spiral circumferential curves;

performing difference processing on corresponding coordinate points on the instantaneous vibration circumferential curve and the current circumferential curve to obtain distances of a plurality of coordinate points; and performing median processing on the distances of the plurality of coordinate points to obtain a vibration difference distance;

performing curve correction on the current circumferential curve according to the vibration difference distance to obtain a corrected circumferential curve; and performing vector processing on the corrected circumferential curve according to the acceleration data of the current circumferential motion trajectory to determine a corrected circumferential motion trajectory; and filtering out irregular trajectories of the current circumferential motion trajectory within a predefined error range with the corrected circumferential motion trajectory to obtain the ideal circumferential motion trajectory of the wind power bearing holder;

generating a corresponding ideal circumferential spatial region and a corresponding predicted circumferential spatial region for the ideal circumferential motion trajectory and the predicted circumferential motion trajectory, respectively; and comparing locations of spatial region probability centroids between the ideal circumferential spatial region and the predicted circumferential spatial region to obtain a predicted coincided spatial region, further comprising:

generating a first spiral cylinder corresponding to the ideal circumferential spatial region and a second spiral cylinder corresponding to the predicted circumferential spatial region, respectively, according to the ideal circumferential motion trajectory and the predicted circumferential motion trajectory; wherein the first spiral cylinder and the second spiral cylinder both contain location information of multi-point locations;

acquiring location information of a first point location in the first spiral cylinder;

acquiring a point location distribution plane region corresponding to the location information of the first point location according to a saliency of a probability distribution function; and locating a centroid of the first spiral cylinder in the point location distribution plane region via the probability density function to obtain first centroid location information of the first spiral cylinder;

locating a centroid of the second spiral cylinder in the point location distribution plane region to obtain second centroid location information of the second spiral cylinder; and performing a three-dimensional spatial coincidence comparison in a same time domain and a same space domain between the first spiral cylinder and the second spiral cylinder according to the first centroid location information and the second centroid location information, comprising moving the first spiral cylinder and the second spiral cylinder in the three-dimensional space according to the first centroid location information and the second centroid location information, overlapping spatial volumes of the first spiral cylinder and the second spiral cylinder according to locations of corresponding point locations, and determining a predicted coincided spatial region coinciding with the first spiral cylinder and the second spiral cylinder; and determining whether there is an abnormality in operation of the wind power bearing holder according to the predicted coincided spatial region to obtain operation monitoring information of the wind power bearing, further comprising:

acquiring, via the plurality of sensing chips and the signal acquisition apparatus, an actual circumferential motion trajectory corresponding to the next time period, and determining a third spiral cylinder related to an actual circumferential spatial region according to the acquired actual circumferential motion trajectory corresponding to the next time period; wherein the actual circumferential motion trajectory is a point location circumferential motion trajectory in the next time period of the ideal circumferential motion trajectory;

locating a centroid of the third spiral cylinder in the point location distribution plane region to obtain third centroid location information of the third spiral cylinder;

performing three-dimensional spatial coincidence comparison in a same time domain and a same spatial domain between the first spiral cylinder and the third spiral cylinder according to the third centroid location information to obtain a real coincided spatial region; and comparing the real coincided spatial region and the predicted coincided spatial region in the same time domain and the same space domain to obtain a three-dimensional space coincidence degree, determining whether there is an abnormality in operation of the wind power bearing holder based on the three-dimensional space coincidence degree and spatial region size determination information of the real coincided spatial region and the predicted coincided spatial region, generating the operation monitoring information of the wind power bearing, and sending the operation monitoring information of the wind power bearing to maintenance personnel through the signal server of the wind power generator in real time, to complete operation monitoring of the wind power generator.

2. The method for monitoring operation of a wind power bearing holder according to claim 1, wherein the determining point location tracking information for all sensing chips based on the auxiliary coordinate data and target coordinate data of the first sensing chip, further comprises:

performing coordinate data-related weight value fusion on auxiliary coordinate data of the adjacent cluster head nodes and main coordinate data of the main cluster head node in the current time period by fusing the auxiliary coordinate data into the main coordinate data based on proportions of different weights to reduce tracking and locating errors caused by only tracking and locating the first sensing chip to obtain the target coordinate data of the first sensing chip;

determining the signal transmitting node of the first sensing chip as an adjacent cluster head node according to a grid structure of a predefined wireless sensor network (WSN), and determining the target coordinate data as adjacent coordinate data;

minimizing an average spatial distance between coordinate data of a fourth sensing chip and the target coordinate data of the first sensing chip to obtain target coordinate data of the second sensing chip based on the coordinate data-related weight value fusion; wherein the fourth sensing chip and the first sensing chip are located in left and right adjacent positions of the second sensing chip;

performing coordinate data-related weight value fusion on all the sensing chips, and determining target coordinate data of all the sensing chips by sequentially determining each remaining sensing chip as the main cluster head node and corresponding adjacent sensing chips as adjacent cluster head nodes according to the grid structure of the predefined WSN; and acquiring acceleration data corresponding to the plurality of sensing chips in the current time period according to a time period in which each sensing chip is located; and determining the point location tracking information of all the sensing chips based on the target coordinate data and corresponding acceleration data of all the sensing chips.

3. A device for monitoring operation of a wind power bearing holder, comprising:

the wind power bearing holder in the wind power generator;

the plurality of sensing chips embedded and uniformly distributed inside the wind power bearing holder to enable the wind power bearing holder to achieve rotational balance, wherein each sensing chip has the signal transmission function of transmitting the real-time coordinate data and the acceleration data;

the signal acquisition apparatus in the wind power generator and configured to acquire signals transmitted by the plurality of sensing chips;

the vibration sensor in the wind power generator and configured to acquire vibration acceleration of the wind power bearing holder;

the signal server connected to the signal acquisition apparatus;

at least one processor; and a memory in communication connection to the at least one processor; wherein the memory stores instructions executable by the at least one processor to enable the at least one processor to perform the method for monitoring operation of the wind power bearing holder according to claim 2.

4. A device for monitoring operation of a wind power bearing holder, comprising:

the wind power bearing holder in the wind power generator;

the plurality of sensing chips embedded and uniformly distributed inside the wind power bearing holder to enable the wind power bearing holder to achieve rotational balance, wherein each sensing chip has the signal transmission function of transmitting the real-time coordinate data and the acceleration data;

the signal acquisition apparatus in the wind power generator and configured to acquire signals transmitted by the plurality of sensing chips;

the vibration sensor in the wind power generator and configured to acquire vibration acceleration of the wind power bearing holder;

the signal server connected to the signal acquisition apparatus;

at least one processor; and a memory in communication connection to the at least one processor; wherein the memory stores instructions executable by the at least one processor to enable the at least one processor to perform the method for monitoring operation of the wind power bearing holder according to claim 1.

* * * * *